United States Patent
Varga et al.

(10) Patent No.: US 6,819,440 B1
(45) Date of Patent: Nov. 16, 2004

(54) SYSTEM, METHOD, AND PROGRAM FOR AUTOMATICALLY SWITCHING OPERATIONAL MODES OF A PRINTER BETWEEN DIRECT AND PRINT-ON-DEMAND (POD) MODES

(75) Inventors: John Thomas Varga, Longmont, CO (US); Rose Ellen Visoski, Louisville, CO (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/571,666

(22) Filed: May 15, 2000

(51) Int. Cl.$^7$ .............................. B41B 15/00
(52) U.S. Cl. ..................... 358/1.13; 358/1.15
(58) Field of Search .................. 358/1.13, 1.14, 358/1.15, 1.9, 2.1

(56) References Cited

U.S. PATENT DOCUMENTS

| | | | |
|---|---|---|---|
| 5,157,765 A | 10/1992 | Birk et al. ............... | 395/163 |
| 5,434,967 A | 7/1995 | Tannenbaum et al. ...... | 395/163 |
| 5,706,410 A | 1/1998 | Bagley et al. ............ | 395/112 |
| 5,786,826 A | 7/1998 | Kwok ..................... | 345/505 |
| 5,971,582 A | 10/1999 | Fuji ....................... | 364/400 |
| 5,987,226 A | 11/1999 | Ishikawa et al. .......... | 395/112 |
| 6,317,218 B1 * | 11/2001 | Yorkey et al. ............ | 358/1.13 |
| 6,396,591 B1 * | 5/2002 | Harrington et al. ........ | 358/1.13 |
| 6,630,936 B1 * | 10/2003 | Langendorf ............... | 345/562 |

* cited by examiner

Primary Examiner—Thomas D. Lee
Assistant Examiner—Stephen Brinich
(74) Attorney, Agent, or Firm—Scott W. Reid; Dillon & Yudell, LLP

(57) ABSTRACT

A method, system, and program for automatically switching operational modes of a printer between direct and on-demand modes. A rasterizer receives a data stream containing various data sets to be presented. The rasterizer detects occurrences of an include command that specifies remotely stored data that is to be presented. In response to the detected include commands, the rasterizer automatically switches between a direct mode and an on-demand mode of presentation as an operational mode for the printer while continuously processing the data stream. The printer is initialized to operate in a desired operational print mode. If the printer is operating in the on-demand mode of presentation, the print rasterizer switches the printer to operate in the direct mode when the print rasterizer detects a predetermined number of consecutive pages that do not have the include command. Conversely, when the printer is operating in the direct mode of presentation, the print rasterizer switches the printer to operate in the on-demand mode when the print rasterizer detects a predetermined number of consecutive pages containing the include command. The present invention is not limited to being implemented in a printer and may also be implemented in a display device.

18 Claims, 2 Drawing Sheets

SYSTEM, METHOD, AND PROGRAM FOR AUTOMATICALLY SWITCHING OPERATIONAL MODES OF A PRINTER BETWEEN DIRECT AND PRINT-ON-DEMAND (POD) MODES

BACKGROUND OF THE INVENTION

1. Technical Field

The present invention relates in general to document presentation, and, in particular, to document presentation in a direct mode and a production-level print-on-demand (POD) mode.

2. Description of the Related Art

A document is generally a data collection created by an application program, such as a word processing application, that is logically subdivided into pages. A page comprises objects, such as text, images, graphical objects, and display elements, that are to be displayed on one side of a sheet, subject to various formatting specifications, such as size, margins, font, color, depth, etc. When printed, document pages are presented on sheets, which are presentation units generally having at least two sides (e.g., a front side and a back side). Each side of a sheet may contain one or more pages.

When a document is presented by a printer or display device, the printer or display device receives and processes a data stream that contains the document to be presented. Ideally, the data stream should produce the same document content in the same format on different printers or display devices, subject to the capabilities of each of the printers or display devices. Documents may be presented by a printer or display device in either of a direct mode and an "on-demand" mode (e.g., Print-On-Demand ("POD") mode).

In a direct mode of printing, a rasterizing processor (or rasterizer) within the print control unit of the printer receives and processes the data from the data stream into at least rasterized data (e.g., text, graphics, objects, pixels, fonts, etc.) and a sheet specification (e.g., length, width, margins, and other format parameters of the sheet) for each sheet of the document. The rasterized data are stored (i.e., typically compressed and stored) into a local print memory system, and a pointer identifies the location in the local memory system where the rasterized data are stored for each side or object of a sheet. Each two-sided sheet therefore typically has at least two pointers (i.e., one pointer for each side of the sheet) in the local memory system. The sheet specification for each sheet of the document is stored in the same or another memory system of the printer in a queue format (e.g., in a "sheet queue").

The printer then accesses and processes the sheet specification for each sheet in the sheet queue, typically in a first-in, first-out manner (i.e., first sheet specification sent to sheet queue is processed first).

Based on the next sheet specification in the sheet queue, the printer locates the respective rasterized data for the sheet in the printer memory system utilizing the pointer(s) for the side(s) of the sheet. The printer directs the rasterized data for the sheet to the print head. The print head receives the respective rasterized data for the sheet and accordingly prints the sheet. Thus, the direct mode of printing involves printing a sheet of a document "on-the-fly" utilizing rasterized data stored locally in the printer memory system. This method of printing is particularly useful for printing a large volume of simplistically formatted sheets, such as a large number of sheets printed for a billing application.

In the POD mode of printing, a rasterizing processor within the print control unit of a printer also receives and processes the data stream into a sheet specification and rasterized data for each sheet of the document. The sheet specification in the POD mode contains a side specification, which is a list of the object(s) for each side of the sheet. The rasterizing processor directs the sheet specification for each sheet to be stored in a print memory system in a queue format (e.g., in a sheet queue). However, in the POD mode the rasterizing processor directs storage of the rasterized data, which contains the rag object(s) for each sheet of the document, in a database since the rasterizing code does not build the sides of the document sheets.

To present a document in POD mode, the printer obtains and processes the next sheet specification from the sheet queue. The printer forwards the side specification(s) for the side(s) of the sheet to side builder code within the print control unit. The side builder code retrieves the objects listed in the sheet specification for the sheet from the database and builds the data for the side(s) of the sheet. After the data for the side(s) of a sheet are built, the built side(s) of the sheet are stored into a local print memory system. The printer then sends a command to the print head to print the sheet after the data for the sides are built. In response to the print command, the print head retrieves the data for the side(s) of the sheet from the print memory system and prints the sheet. Thus, the POD mode of printing involves building side(s) of a sheet from an object list stored in a sheet queue and accessing the objects stored in a database in order to build the side(s) of the sheet. This method of printing is particularly useful for printing sheets with more complex data, such as printing sheets from a book.

Some printers can support both direct and POD modes of printing. However, in conventional dual-mode printers, the processor(s) of the printer must be rebooted and reconfigured (i.e., manual re-booting) each time the rasterizer of the printer is switched between modes. Such conventional printers are not able to automatically switch between different modes of printing. Rebooting a printer each time the printing mode is changed is an extremely cumbersome, tedious, and time-consuming process. If the printer mode is not switched when a mode switch should be made so as to avoid rebooting the printer or reconfiguring the processor(s) of the printer every time a switch in print mode should be made, then this typically results in print jobs being printed in an inefficient print mode.

In view of the foregoing and other drawbacks of the prior art, it can be appreciated that there is a need for an improved system for printing documents in a plurality of modes.

SUMMARY OF THE INVENTION

A method, system, and program for automatically switching operational modes of a presentation device between direct and on-demand modes are disclosed. A rasterizer of a presentation device receives a data stream containing various data sets to be presented. The rasterizer detects occurrences of an include command that specifies previously stored rasterized data in the database that is to be presented. In response to the detected include commands, the rasterizer automatically switches between a direct mode and an on-demand mode of presentation as an operational mode for the presentation device while continuously processing the data stream.

In a preferred embodiment in which the presentation device is a printer, the printer is initialized to operate in a desired operational print mode. If the printer is operating in the on-demand mode of presentation, the print rasterizer tracks a predetermined number of consecutive pages that do not contain an include command. The print rasterizer then switches the printer to operate in the direct mode if the print rasterizer has detected the predetermined number of consecutive pages that do not have the include command. Conversely, if the printer is operating in the direct mode of presentation, the print rasterizer tracks a predetermined number of consecutive pages that contain an include command. The print rasterizer then switches the printer to operate in the on-demand mode of presentation if the print rasterizer has detected the predetermined number of consecutive pages containing the include command. The present invention is not limited to being implemented in a printer and may also be implemented in a display device.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF PREFERRED EMBODIMENTS

Figure 1:
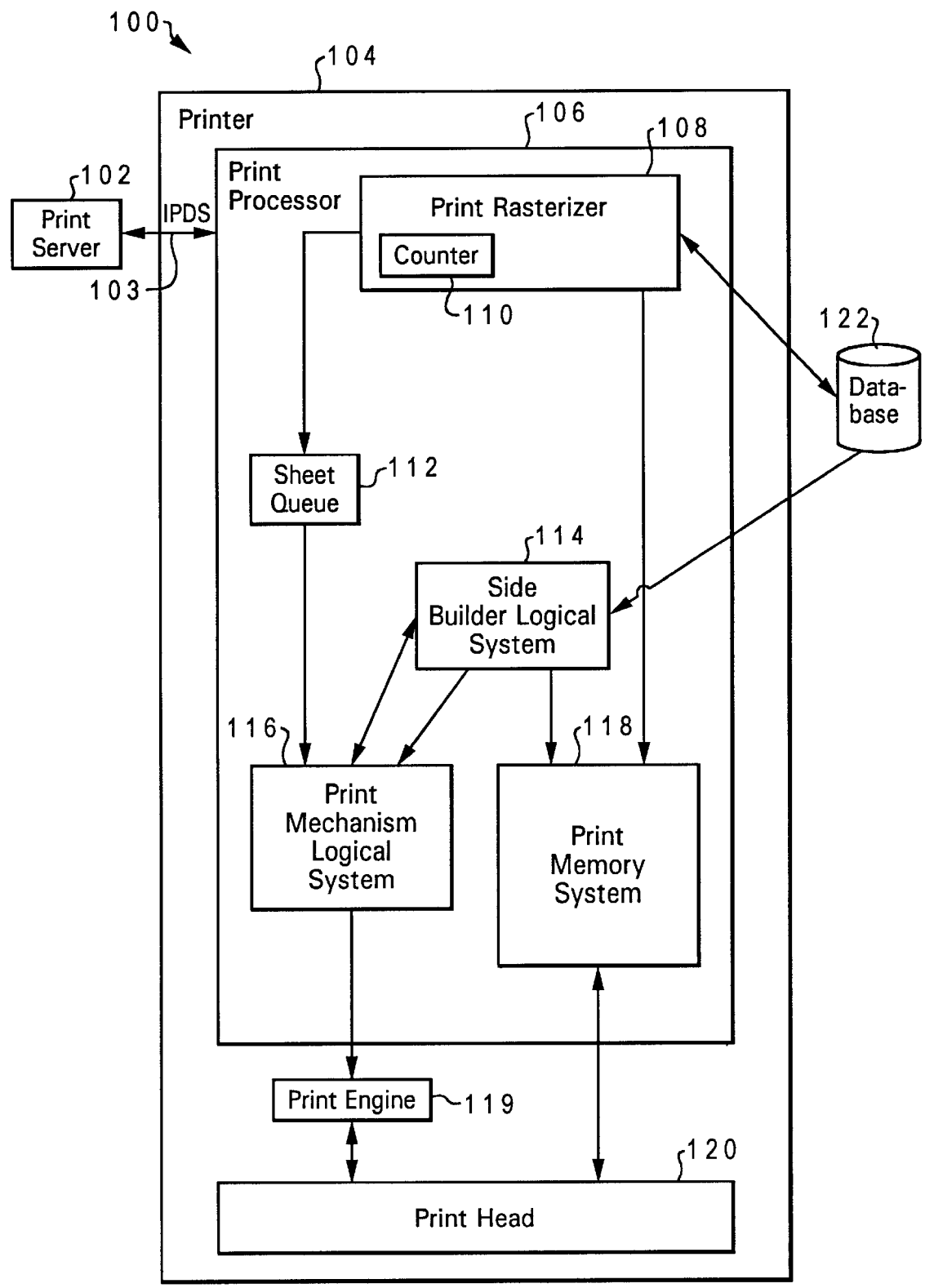
FIG. 1 is an exemplary block diagram of a printer that automatically switches between operational print modes in accordance with the present invention.

With reference now to FIG. 1, an exemplary block diagram of a printing system 100 that automatically switches between operational print modes (e.g., between a direct mode and a print-on-demand (POD) mode of printing) in accordance with the present invention is shown.

Printing system 100 includes a printer 104 and a print server 102 that manages the printing of documents by printer 104. Print server 102 has or receives a data stream. An exemplary data stream may employ the Mixed Object Document Content Architecture (MO:DCA) developed by International Business Machines ("IBM") Corporation of Armonk, N.Y.

In response to receipt of a print file (e.g., a MO:DCA print file) within the data stream (e.g., MO:DCA data stream), print server 102 translates the print file into an appropriate presentation data stream (e.g., IPDS 103). IPDS is disclosed in detail in *Data Stream and Object Architectures: Intelligent Printer Data Stream (IPDS) Reference*, Copyright IBM Corp. 1987, 1993, which is hereafter referred to as the IPDS specification and is incorporated by reference herein. IPDS 103 is received at printer 104 by print processor 106, which comprises a print rasterizer 108 (also known as a raster image processor ("RIP")) that renders each page of document data within IPDS 103 into a presentation-ready format (e.g., bit-mapped format). Print rasterizer 108 may be a single rasterizer or a parallel rasterizer. Print rasterizer 108 automatically switches printer 104 between a direct mode and a POD mode as discussed further below.

Print processor 106 further includes a sheet queue 112, a side builder logical system 114, a print mechanism logical system 116, and local print memory system 118. Print processor 106 is in communication with a print head 120, which prints a rasterized or bit-mapped version of the data in IPDS 103. Coupled to print processor 106 is a database 122, which may be a local or remote database that stores document data that have been cached by print processor 106 when printer 104 is operating in the POD mode. Side builder logical system 114 is coupled to database 122 to receive document data therefrom. Side builder logical system 114 is also coupled to communicate with print mechanism logical system 116 and print memory system 118. A print engine 119 is coupled to print mechanism logical system 116, and print head 120 is coupled in communication with local print memory system 118 and print mechanism logical system 116. Print engine 119 comprises the components of printer 104 that generate a printed image based on control signals provided by print processor 106. Print mechanism logical system 116 interprets the sheet specification and sends the appropriate commands to the print head 120 via the print engine 119. Print head 120 is the part of printer 104 that actually controls the mechanical imprinting of characters on sheets of paper.

When printer 104 operates in direct mode, print rasterizer 108 rasterizes the data within IPDS 103 to generate at least rasterized data (i.e., text, graphics, objects, pixels, fonts, etc.) and the sheet specification (e.g., length, width, margins and other format parameters of the sheet) for each sheet of the document. The rasterized data for the direct mode are stored (i.e., typically compressed and stored) into local print memory system 118. A pointer identifies the location in local print memory system 118 where the rasterized data are stored for each side or object of a sheet in the direct mode of printing. Each two-sided sheet therefore typically has at least two pointers (i.e., one pointer for each side of the sheet) in local print memory system 118 that point to the rasterized data for the sheet.

In the direct mode of printing, the rasterized data from print rasterizer 108 are in a renderable format that is directly printable by print head 120. Print rasterizer 108 preprocesses the data so that each side of the sheet has already been built prior to sending the rasterized data to local print memory system 118. The rasterized data is then sent from local print memory system 118 to print head 120. The sheet specification for each sheet of the document is stored in the same (e.g., local print memory system 118) or another memory system of printer 104 in a sequential order (e.g., in a sheet queue 112).

A software print mechanism logical system 116 operating in the memory system of printer 104 processes the sheet specification for each sheet in sheet queue 112, typically in a first-in, first-out order (i.e., first sheet specification sent to sheet queue 112 is processed first). Print mechanism logical system 116 obtains the next sheet specification from sheet queue 112 and communicates the sheet specification to print head 120 through print engine 119. One or more pointers for the one or more sides in print memory system 118 are used to locate the respective rasterized data for the sheet. Print head 120 receives the sheet specification and the rasterized data for the sheet and prints the sheet. Thus, the direct mode of printing involves printing a sheet by directly accessing and presenting the rasterized data stored in local print memory system 118.

When printer 104 operates in the POD mode, print processor 106 receives IPDS 103 for a document from print server 102. Print rasterizer 108 within print processor 106 processes IPDS 103 into current rasterized data and a side specification for each side of the document. In contrast to the rasterized data produced in direct mode, the rasterized data produced by print rasterizer 108 in the POD mode may refer to one or more rasterized object(s) previously stored in database 122 that are to be presented within each side of the document. The current rasterized objects are also stored in database 122 since print rasterizer 108 does not build the sides of the sheet. The side specification produced by print rasterizer 108 provides a list of the object(s) to be presented on each side. The sheet specification for a two-sided sheet preferably includes a side specification for each side of the sheet, where each side specification contains the list of objects to be displayed on that side of the sheet. The sheet specifications are stored in the same memory system (e.g., local print memory system 118) as the rasterized data or another memory system of printer 104 in a sequential order (e.g., in sheet queue 112).

When printer 104 operates in the POD mode, print mechanism logical system 116 processes the sheet specification for each sheet in sheet queue 112, typically in a first-in, first-out manner (i.e., first sheet specification sent to sheet queue 112 is processed first). Print mechanism logical system 116 forwards the side specifications for the sides of a sheet to a software side builder logical system 114 operating in a printer memory system, such as local print memory system 118. Side builder logical system 114 retrieves the objects listed in the side specification for the side from database 122 and creates the bit-mapped or rasterized data for the sides of a sheet. After the rasterized data for the sides of a sheet are created, side builder logical system 114 sends a message to print mechanism logical system 116 indicating that the sides of a sheet have been built and stores the rasterized data for the built sides of a sheet into local print memory system 118. Print mechanism logical system 116 then sends a print command to print the rasterized data for sheets to print engine 119, and print engine 119 in turn directs print head 120 to print sheets utilizing the rasterized data. In response to receiving the print command and the data for the sides of sheets from local print memory system 118, print head 120 prints sheets of the document. Thus, the POD mode of printing involves building sides of a sheet utilizing current and previously stored objects that are specified in a locally stored list.

Figure 2:
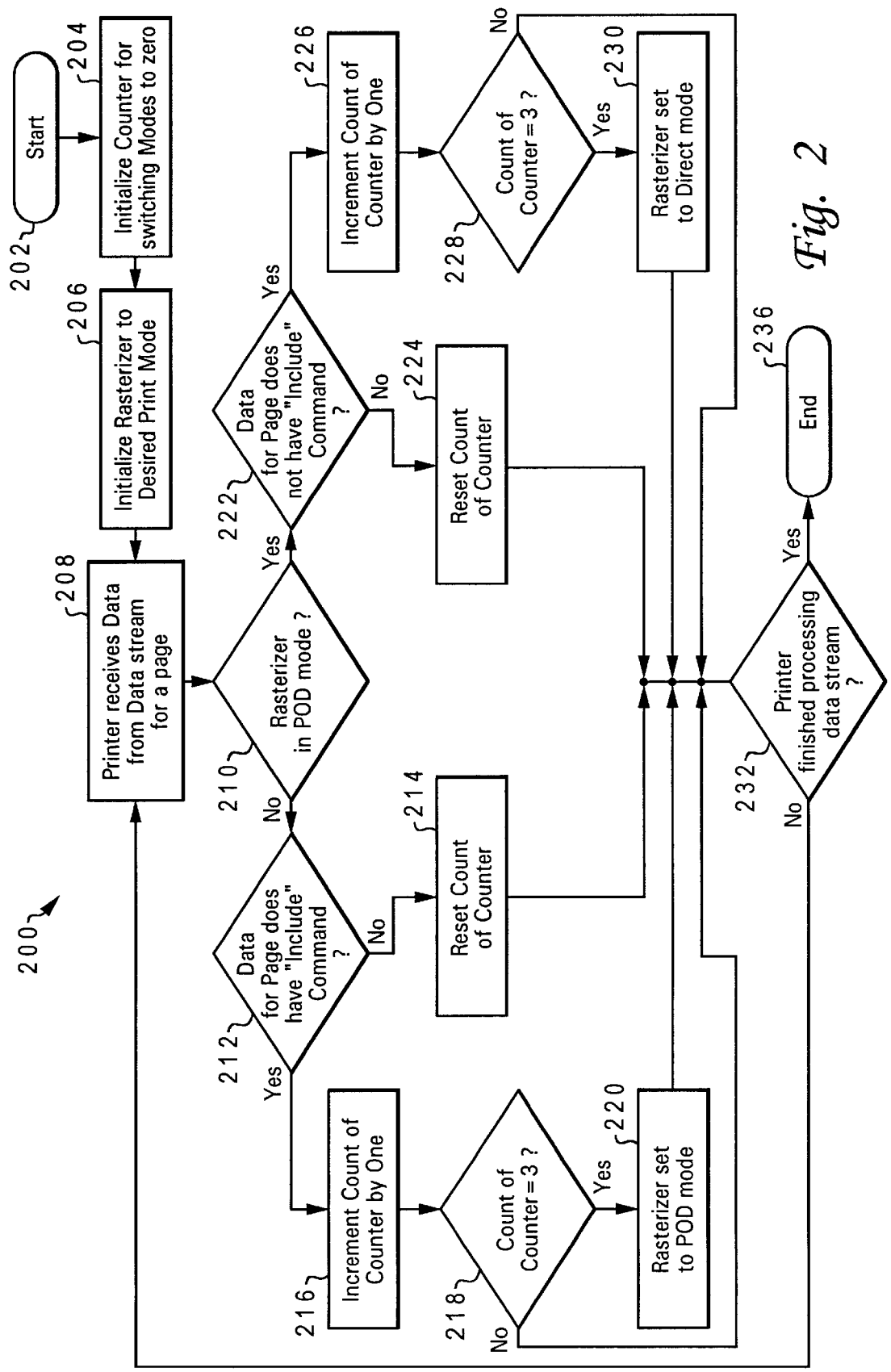
FIG. 2 is a flow chart of an exemplary method and program function for automatically switching the operational print mode of a printer in accordance with the present invention.

Referring now to FIG. 2, a flow chart of an exemplary method 200 and program function for automatically switching the operational print modes of printer 104 in accordance with the present invention is shown. Exemplary method 200 is executed by print rasterizer 108 to process IPDS 103 on a per page basis. As stated earlier, IPDS 103 contains one or more documents each comprising one or more pages.

Method 200 starts at block 202 and then moves to block 204, where counter 110 is initialized to zero. At block 206 print rasterizer 108 is initialized to a desired print mode (e.g., either the direct mode or the POD mode). At block 208, print rasterizer 108 receives data for a page from a data stream (e.g., IPDS 103).

Method 200 moves from block 208 to decision block 210, where the method determines whether print rasterizer 108 is operating in the POD mode or the direct mode. If at decision block 210 print rasterizer 108 is operating in the direct mode, then method 200 moves to decision block 212. Decision block 212 depicts print rasterizer 108 determining whether the page to be processed for printing contains an "include" command, such as "include-saved-page" command. As described in the IPDS specification, an "include-saved-page" command causes a previously stored page or page segment resource to be processed in the input data stream as though its commands had just been received from the host. These "include" commands imply access to data that has been saved to a disk (e.g., hard disk or database system 122). If at decision block 212, a determination is made that the page does not contain an "include" command (e.g., "include-saved-page" command), then method 200 moves from decision block 212 to block 214, which depicts print rasterizer 108 resetting the count of counter 110 to a zero value. Method 200 then moves from block 214 to decision block 232. However, if at decision block 212 a determination is made that the page contains an "include" command, then method 200 moves from decision block 212 to block 216. Block 216 depicts print rasterizer 108 incrementing the count of counter 110 by one.

Method 200 then proceeds from block 216 to decision block 218, which shows print rasterizer 108 determining whether the count of counter 110 has reached a predetermined number of consecutive pages that contain an "include" command. If counter 110 has reached the predetermined number of consecutive pages (e.g., three), then print rasterizer 108 switches the operational print mode of printer 104 to the POD mode, as illustrated at block 220. Method 200 then moves from block 220 to decision block 232. However, if at decision block 218 a determination is made that counter 110 has not reached the predetermined number of consecutive pages, then method 200 moves from decision block 218 to decision block 232.

Returning to block 210, if a determination is made that print rasterizer 108 is operating in the POD mode, then method 200 moves to decision block 222. Decision block 222 depicts print rasterizer 108 determining whether or not the page to be processed contains an "include" command. If a determination is made at decision block 222 that the page contains an "include" command, then method 200 moves from decision block 222 to block 224, which depicts print rasterizer 108 resetting the counter 110 to zero. Method 200 then moves from block 224 to decision block 232. However, if a determination is made at decision block 222 that the data for the page does not contain an "include" command, then method 200 moves from decision block 222 to block 226. Block 226 depicts print rasterizer 108 incrementing the counter 110 by one.

Method 200 then proceeds from block 226 to decision block 228, which shows print rasterizer 108 determining whether the count of counter 110 has reached a predetermined number of consecutive pages that do not contain an "include" command. If counter 110 has reached the predetermined number of consecutive pages (e.g., three consecutive pages that each does not contain an "include" command), then print rasterizer 108 switches the print mode of printer 104 to the direct mode, as depicted at block 230. Method 200 then moves from block 230 to decision block 232. However, if a determination is made at decision block 228 that counter 110 has not reached the predetermined number of consecutive pages, then method 200 moves from decision block 228 directly to decision block 232.

Decision block 232 depicts print rasterizer 108 determining whether printer 104 has finished processing the data stream (e.g., IPDS 103) received from print server 102. If a determination is made at decision block 232 that printer 104 has not finished processing the data stream, then method 200 returns to block 208, which illustrates printer 104 receiving data from the data stream for another page and processing the data in the current print mode. On the other hand, if a determination is made at decision block 232 that printer 104 has finished processing the data stream (IPDS 103), then method 200 finally ends at block 236.

As illustrated in FIG. 2, the present invention permits a printer or other presentation device to switch between different presentation modes while continuously processing a presentation data stream and without rebooting the presentation device. While the invention has been particularly shown and described with reference to a preferred embodiment, it will be understood by those skilled in the art that various changes in form and detail may be made therein without departing from the spirit and scope of the invention. For example, although aspects of the present invention have been described with respect to a computer system executing software that directs the functions of the present invention, it should be understood that the present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A method of operating a presentation device, said method comprising:

the presentation device receiving from an external source a data stream containing a plurality of data sets to be presented;

the presentation device detecting within the data stream occurrences of an include command that specifies remotely stored data that is to be presented;

in response to detecting said occurrences of said include command in the data stream, the presentation device automatically switching between a direct mode and an on-demand mode of presentation as an operational mode for the presentation device in presenting one or more of said plurality of data sets in said data stream;

wherein when said presentation device operates in said direct mode, said presentation device receives said data stream from the external source, rasterizes data within said plurality of data sets, stores said rasterized data locally, and then presents said rasterized data; and wherein when said presentation device operates in said on-demand mode, said presentation device receives said data stream from the external source, processes data within said plurality of data sets into one or more object lists, and builds one or more presentation units at presentation time from objects identified within said one or more object lists.

2. The method according to claim 1, further comprising: initializing the presentation device to operate in a desired operational mode.

3. The method according to claim 1, wherein the data sets in the data stream are pages, said method further comprising:

if the presentation device is operating in the on-demand mode of presentation, tracking a predetermined number of consecutive pages that do not contain the include command; and switching the presentation device to operate in the direct mode when the predetermined number of consecutive pages that do not contain the include command are detected.

4. The method according to claim 3, wherein tracking a predetermined number of consecutive pages that each do not contain the include command further comprises:

initializing a counter to zero;

incrementing the counter by one in response to a next page in the data stream not having the include command; and resetting the value of the counter to zero in response to the next page having the include command.

5. The method according to claim 1, wherein the data sets in the data stream are pages and further comprising:

tracking, when the presentation device is operating in the direct mode of presentation, a predetermined number of consecutive pages that contain the include command; and switching to operate in the on-demand mode of presentation when the predetermined number of consecutive pages that contain the include command are detected.

6. The method according to claim 5, wherein tracking a predetermined number of consecutive pages that contain the include command further comprises:

initializing a counter to zero;

in response to a next page in the data stream containing the include command, incrementing the counter by one; and in response to the next page not containing the include command, resetting the counter to zero.

7. A presentation system for use with a database, said presentation system comprising:

a local memory; and a rasterizing processor, coupled to the local memory, that receives a data stream containing various data sets to be presented, detects occurrences of an include command that specifies remotely stored data that is to be presented, and, responsive to detection of occurrences of said include command, automatically switches between a direct mode and an on-demand mode of presentation while continuously processing the data stream;

wherein when said presentation system operates in said direct mode, said presentation system receives said data stream from the external source, rasterizes data within said plurality of data sets, stores said rasterized data locally, and then presents said rasterized data; and wherein when said presentation system operates in said on-demand mode, said presentation system receives said data stream from the external source, processes data within said plurality of data sets into one or more object lists, and builds one or more presentation units at presentation time from objects identified within said one or more object lists.

8. The presentation system according to claim 7, wherein the presentation system is initialized to operate in a desired mode.

9. The presentation system according to claim 7, wherein the data sets in the data stream are pages, and wherein the rasterizing processor switches the presentation system from the on-demand mode to the direct mode if the rasterizing processor detects a predetermined number of consecutive pages that do not contain an include command.

10. The presentation system according to claim 9, wherein:

the rasterizing processor initializes a counter to an initial value;

the rasterizing processor increments the value of the counter in response to a next page in the data stream not containing the include command; and the rasterizing processor resets the value of the counter to the initial value in response to the next page containing the include command.

11. The presentation system according to claim 7, wherein the data sets in the data stream are pages, and wherein the rasterizing processor switches the presentation system from the direct mode to the on-demand mode of presentation if the rasterizing processor has detected a predetermined number of consecutive pages that contain the include command.

12. The presentation system according to claim 11, wherein:

the rasterizing processor initializes a counter to an initial value;

the rasterizing processor increments the value of the counter in response to a next page in the data stream containing the include command; and the rasterizing processor resets the value of the counter to zero in response to the next page not containing the include command.

13. An article of manufacture for use in presentation devices, the article of manufacture comprising computer readable storage media including program logic embedded therein that causes control circuitry to perform the steps of:

receiving a data stream containing a plurality of data sets to be presented;

detecting occurrences of an include command that specifies remotely stored data that is to be presented;

automatically switching between a direct mode and an on demand mode of presentation as an operational mode for the presentation device; and wherein when said presentation device operates in said direct mode, said presentation device receives said data stream from the external source, rasterizes data within said plurality of data sets, stores said rasterized data locally, and then presents said rasterized data; and wherein when said presentation device operates in said on-demand mode, said presentation device receives said data stream from the external source, processes data within said plurality of data sets into one or more object lists, and builds one or more presentation units at presentation time from objects identified within said one or more object lists.

14. The article of manufacture of claim 13 wherein the program logic further causes control circuitry to perform the step of:

initializing the presentation device to operate in a desired operational mode.

15. The article of manufacture according to claim 13, wherein the data sets in the data stream are pages and wherein the program logic further causes control circuitry to perform the step of:

switching the presentation device from the on-demand mode to the direct mode if a predetermined number of consecutive pages do not contain the include command.

16. The article of manufacture according to claim 15, wherein the program logic further causes control circuitry to perform the steps of:

initializing a counter to having an initial value;

in response to a next page in the data stream not containing the include command, incrementing the value of the counter; and in response to the next page containing the include command, resetting the value of the counter to the initial value.

17. The article of manufacture according to claim 13, wherein the data sets in the data stream are pages and wherein the program logic further causes control circuitry to perform the step of:

switching the presentation device from the direct mode to the on-demand mode if a predetermined number of consecutive pages contain the include command.

18. The article of manufacture according to claim 17, wherein the program logic further causes control circuitry to perform the steps of:

initializing a counter to having an initial value;

in response to a next page in the data stream containing the include command, incrementing the value of the counter; and in response to the next page not containing the include command, resetting the value of the counter to the initial value.

\* \* \* \* \*